United States Patent
Gu et al.

(10) Patent No.: US 7,317,682 B2
(45) Date of Patent: Jan. 8, 2008

(54) PASSIVE AND DISTRIBUTED ADMISSION CONTROL METHOD FOR AD HOC NETWORKS

(75) Inventors: Daqing Gu, Burlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 865 days.

(21) Appl. No.: 10/654,841

(22) Filed: Sep. 4, 2003

(65) Prior Publication Data
US 2005/0052995 A1  Mar. 10, 2005

(51) Int. Cl.
H04L 12/26  (2006.01)
(52) U.S. Cl. .................................. 370/230; 370/450
(58) Field of Classification Search .............. 370/233, 370/234, 450, 459
See application file for complete search history.

(56) References Cited

U.S. PATENT DOCUMENTS

| | | | | |
|---|---|---|---|---|
| 4,704,724 A | * | 11/1987 | Krishnan et al. | 379/221.07 |
| 5,031,089 A | * | 7/1991 | Liu et al. | 709/226 |
| 5,253,248 A | * | 10/1993 | Dravida et al. | 370/228 |
| 5,313,454 A | * | 5/1994 | Bustini et al. | 370/231 |
| 5,864,558 A | * | 1/1999 | Johnson | 370/445 |
| 6,377,548 B1 | * | 4/2002 | Chuah | 370/233 |
| 6,907,044 B1 | * | 6/2005 | Yonge et al. | 370/445 |
| 6,922,390 B1 | * | 7/2005 | Chapman et al. | 370/229 |
| 2001/0034790 A1 | * | 10/2001 | Sato et al. | 709/235 |
| 2003/0031129 A1 | | 2/2003 | Dutkiewicz | 370/230 |
| 2004/0095882 A1 | * | 5/2004 | Hamzah et al. | 370/229 |
| 2006/0039281 A1 | * | 2/2006 | Benveniste | 370/230 |

OTHER PUBLICATIONS

Elek et al., in "Admission control based on end-to-end measurements," Proceeding IEEE Infocom, 2000.
Qiu et al., in "Measurement-based admission control with aggregate traffic envelopes," IEEE/ACM Trans. Networking, vol. 9, pp. 199-210, Apr. 2001.
Jamin et al., in "A Measurement-based Admission Control Algorithm for Integrated Services Packet Networks (Extended Version)," ACM/IEEE Transactions on Networking, Dec. 1996.
Bianchi et al., in "Throughput analysis of end-to-end measurement-based admission control in IP," Proceeding IEEE Infocom, 2000.

* cited by examiner

*Primary Examiner*—Chau Nguyen
*Assistant Examiner*—Kevin Mew
(74) *Attorney, Agent, or Firm*—Dirk Brinkman; Clifton D. Mueller; Gene V. Vinokur

(57) ABSTRACT

A method for distributed admission control in communication channels of a network including a plurality of nodes measures, at each node, a traffic condition of a communication channel during successive time intervals having a predetermined length. At the particular node, the measured traffic condition for a last time interval is compared to a threshold. The state of the node is changed depending on the comparing.

8 Claims, 3 Drawing Sheets

PASSIVE AND DISTRIBUTED ADMISSION CONTROL METHOD FOR AD HOC NETWORKS

FIELD OF THE INVENTION

The present invention relates generally to the field of network communication, and more particularly to admission control for networks.

BACKGROUND OF THE INVENTION

A local area network (LAN) is a computer network that spans a relatively small area. Most LANs are confined to a single building or group of buildings. LANs can be interconnected by a wide-area network (WAN). Networks can connect nodes such as workstations, personal computers, printers, entertainment nodes, generally 'nodes'. Networks enable connected nodes to send and receive data.

Carrier sense multiple access/collision detection (CSMA/CD) is technique used to determine how multiple nodes share a single communication channel. A node having data to transmit first checks if the channel is free. If true, the node transmits data. Otherwise, if false, the node waits a random amount of time, and then checks again. If the channel is still busy, then the delay time is increased, and so forth, until the channel becomes free.

A wireless local area network (WLAN) is a shared-medium communication network that transmits information over wireless channels. One standard for a WLAN is IEEE 802.11. IEEE 802.11 networks can be configured arranged in an ad hoc and an infrastructure mode. In ad hoc mode, nodes communicate directly with each other. In infrastructure mode, access points (AP), e.g., base stations, are used to connect nodes to a distribution system (DS), and nodes communicate indirectly via the AP.

The medium access control (MAC) method for 802.11 uses a distributed coordination function (DCF). The DFC is based on carrier sense multiple access/collision avoidance (CSMA/CA) protocol, because collision detection is difficult in wireless transmissions. However, CSMA/CA generates additional overhead and consumes network bandwidth.

To gain access, the MAC Layer checks a network allocation vector (NAV). Each node maintains its own NAV. The vector represents the amount of time waited to send the last packet. The NAV must be zero before a station can attempt to send a next packet. That is, if NAV=0, the channel is not busy, a non-zero value indicates that the channel is busy. Prior to transmitting the packet, the node calculates the amount of time necessary to send the packet based on the packet's length and data rate. The station places a value representing this time in the header of the packet. The receiving node uses the header for setting its own NAVs.

A proposed IEEE 802.11e standard adds a new function called hybrid coordination function (HCF). The HCF uses both a contention-based channel access method, called the enhanced distributed channel access (EDCA) mechanism for contention based transfer and a controlled channel access (HCCA) mechanism for contention free transfer. In EDCA, four channel access categories (ACs) prioritize packet flows.

The differentiated medium access control of EDCA is implemented by assigning different arbitration inter-frame spaces (AIFS) and contention windows (CW) to different ACs. An AC with higher priority is assigned a smaller AIFS and shorter CW to increase the likelihood that higher priority packets are transmitted before lower-priority packets.

In order to protect existing packet flows and optimize network performance, the 802.11e draft standard also describes a distributed admission control method. A node sends an admission request for a particular packet flow to the AP. On receipt of the request, the AP decides whether or not to accept the request. That admission control method performs well in term of protecting packet flows. However, the method is complicated to implement, and cannot be used in ad hoc networks lacking an AP.

A number of channel measurement-based admission control methods are known. Elek et al., in "Admission control based on end-to-end measurements," Proceeding IEEE INFOCOM, 2000, requires the sender to transmit probe packets to the receiver. The probe packets are to characterize the flow of data packets that are to be sent later. The receiver measures the arrival of the probe packets and constructs a measurement report for the sender. The sender than makes an admission decision based on the report. That method relies on the receiver's measurements.

Bianchi et al., in "Throughput analysis of end-to-end measurement-based admission control in IP," Proceeding IEEE INFOCOM, 2000, perform admission control by first sending low priority probing packets to a receiver. The receiver measures arrival statistics, e.g., average arrival rate, of the probing packets over a fixed time interval and makes a decision whether or not there are sufficient resources to support data packet. If there are sufficient resources, then the receiver notifies the transmitter that data transmission can start by sending a feedback packet. That method relies on the receiver's decision.

Qiu et al., in "Measurement-based admission control with aggregate traffic envelopes," IEEE/ACM Trans. Networking, vol. 9, pp. 199-210, April 2001, also measures packet arrival rates in a receiver to determine a traffic envelope, and make admission control decisions. In that method, the sender must first send RSVP packets. The receiver sets packet classifier and scheduling parameters to be used for the data packets.

Jamin et al., in "A Measurement-based Admission Control Algorithm for Integrated Services Packet Networks (Extended Version)," ACM/IEEE Transactions on Networking, December 1996, measure packet delays and packet rates, using a token bucket technique, to make admission decisions.

U.S. Patent Application 20030031129 by Dutkiewicz et al., on Feb. 13, 2003 "Network packet flow admission control," operates by having the sender transmit a packet flow request. The request includes a transmission rate and a required performance level. The receiver determines a maximum allowable transmission rate associated with a maximum performance level, and a number of active nodes including currently active and requesting node, these values are compared with an admission boundary and an admission decision is made accordingly.

There are a number of problems with prior art admission control methods. Some methods require centralized management for making admission decision. Such methods can operate only in infrastructure mode networks. Those methods are of no use to ad hoc networks where there is no centralized management. Other methods are active methods, in that they require the sender to transmit probe or request packets through the network before admission is allowed. That has two problems, first the amount of network traffic is increased, and second the probing induces delays before data can actually be transmitted. Furthermore, in some of those methods, the measuring based on the probe traffic is done in the receiver. And in some cases, it is the receiver that makes the decision whether to admit or not.

Therefore, there is a need for a passive admission control method that is entirely under control of the sender, and that does not increase network traffic to effect admission. Furthermore, it is desired to distribute the admission control over the network in cases where the network lacks an infrastructure.

SUMMARY OF THE INVENTION

Each node in a network performs a method for distributed admission control in communication channels of the network. A node measures a traffic condition of the communication channel during successive time intervals having a predetermined length and compares the measured traffic condition for a last time interval to a threshold. Depending on the comparing, the node changes state.

If the node is in an idle state, the measured traffic condition is channel occupancy. If the node is a busy state, the measured traffic condition is a collision ratio.

DETAILED DESCRIPTION OF THE PREFERRED EMBODIMENT

System Structure

Figure 1:
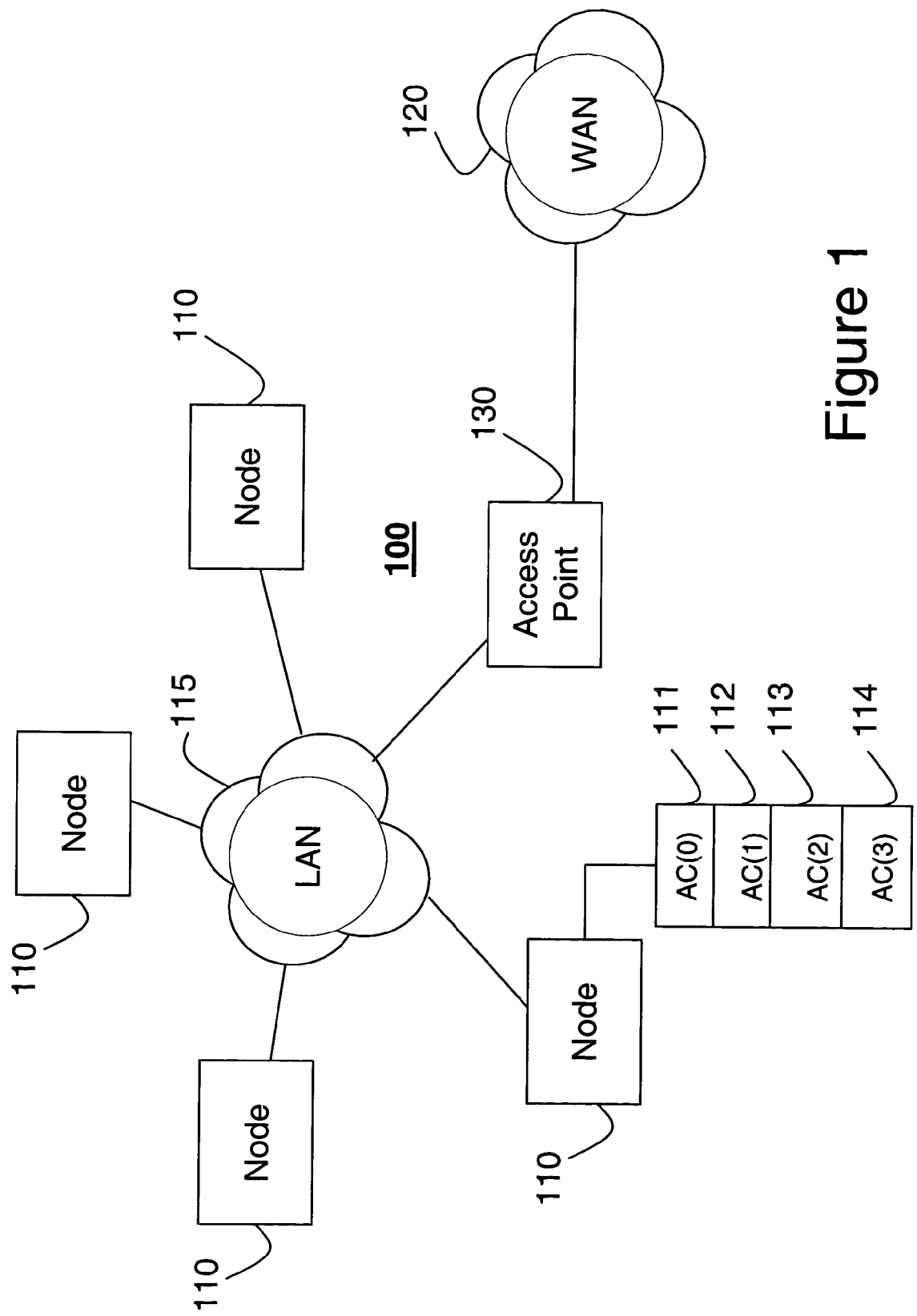
FIG. 1 is a block diagram of a network that uses the invention.

FIG. 1 shows a network 100 that uses the invention. The network can include wireless 115 and wired portions. Portions of the network can be ad hoc. Nodes 110 connected to the network communicate with each other using packets. If the network is a wireless network operating in infrastructure mode, then an access point 130 can be used to connect to other networks 120.

Access categories (AC) 111-114 define priority levels for packets to be transmitted on the network. Access categories can be active or inactive.

System Operation

Figure 2:
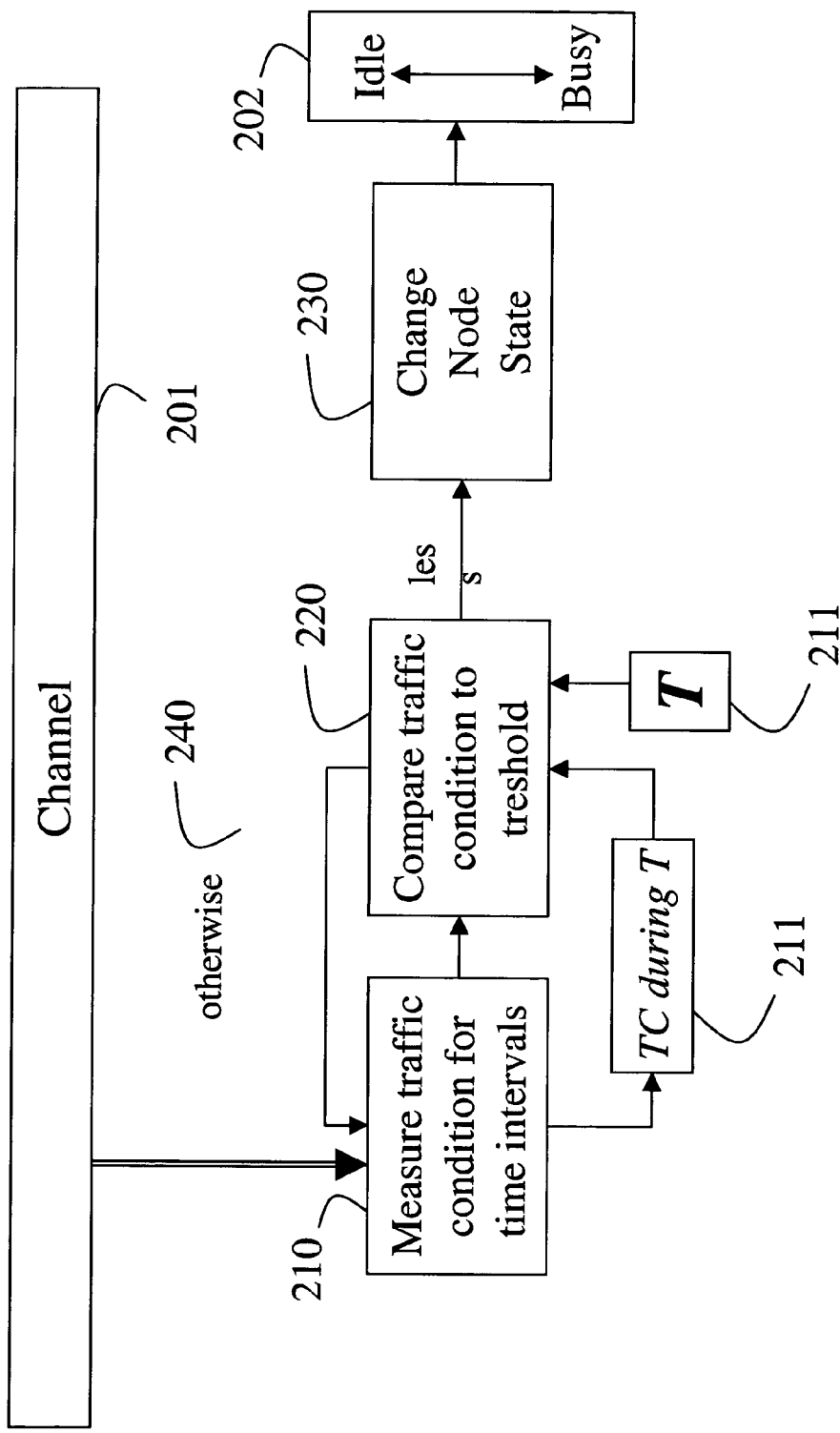
FIG. 2 is a flow diagram of an admission control method according to the invention.
Figure 3:
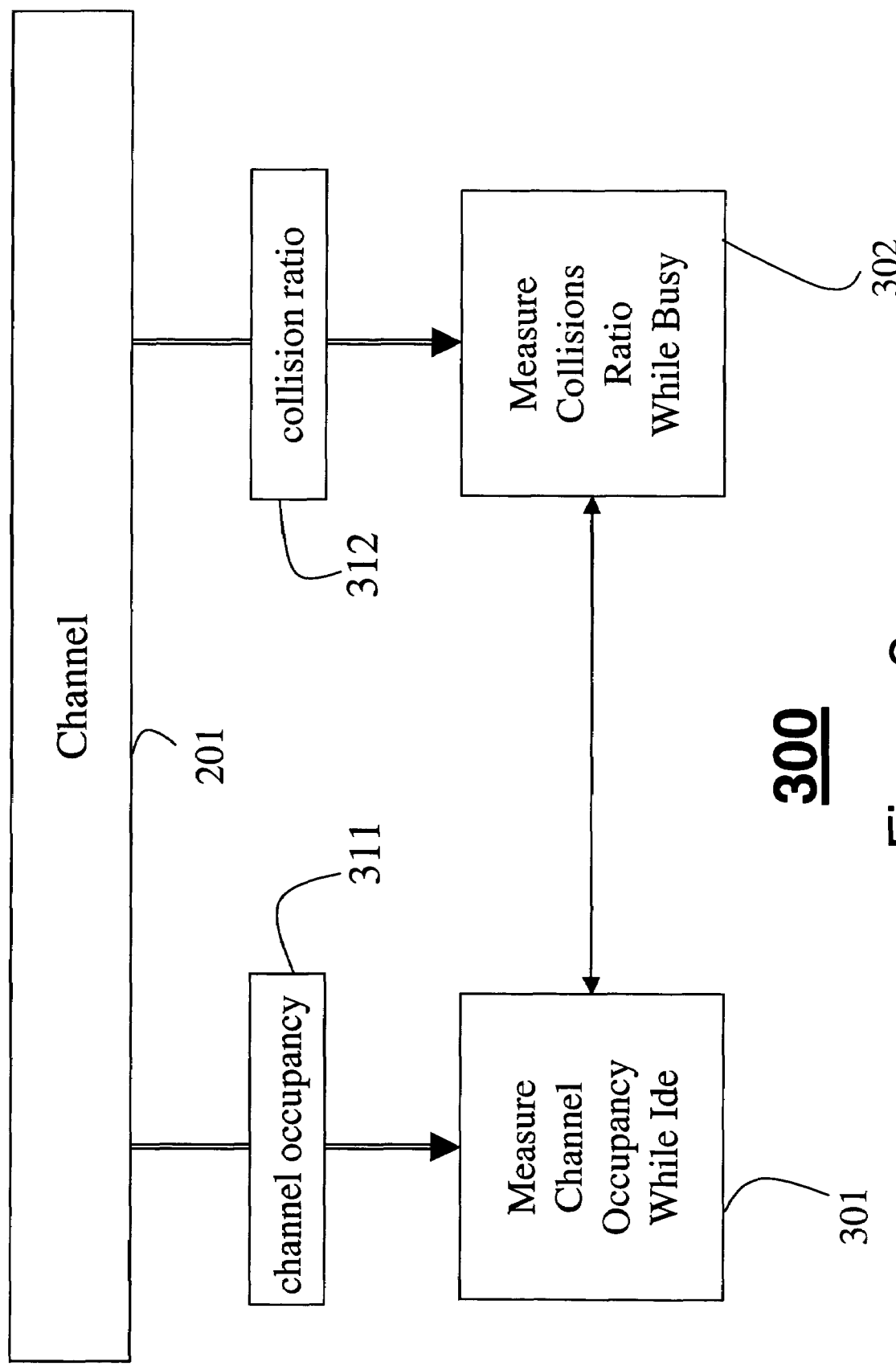
FIG. 3 is a flow diagram of an extension of the admission control method according to the invention.

FIGS. 2 and 3 shows a passive and distributed admission control method for an ad hoc network. Each node has a state 202 of either 'idle' 301 (not transmitting packets) or 'busy' 302 (transmitting packets).

Each node, measures 210 periodically and passively, a channel 201 of the network to determine a traffic condition TC 211 during successive time intervals T having a predetermined length. The measured traffic condition 211 depends on a state 202 of a particular node.

If the node is idle 301, then the condition measured is channel occupancy 311, that is, the relative amount of time that a carrier signal is present in the channel 201. If the state is busy 302, then the traffic condition is a collision ratio 312, that is, the relative number of packets that need to be retransmitted because packets were lost due to collisions.

If the state of the node is idle 301, then from time to time, the node desires to be admitted to the channel to transmit packets and get busy. At such a time, the measured traffic condition for a last time interval is compared 220 to a threshold T 221. If the traffic condition is less than the threshold, then the node admits itself to channel, and the packets are transmitted as described below. Otherwise 240, the node continues the measuring 210 in the idle state until the node is admitted. Thus, in the method according to the invention, the admission control is distributed among all of the nodes and each particular node makes an independent decision to enter the channel, or not.

After the node admits itself, it can perform standard collision detection or avoidance procedures to ensure that another node did not enter the channel while performing the comparing 220 step. If a collision is unlikely, the node transmits a data packet in the busy state, and then continues the measuring 210 until another data packet is ready for transmission.

Measuring Channel Traffic Condition in Idle State

The measured traffic condition 211 can be based on an amount of time that the channel is occupied while the node itself is idle. In other words, each node that is not transmitting detects the presence of a carrier signal in the channel to determine whether the channel is occupied by packets of other nodes.

If each node samples the channel 100 times a minute, and detects the carrier signal 50 times, then the channel is 50% occupied. Thus, the value TC is $$\sum_i t_i,$$

where $t_i$ is a sample indicating the channel is occupied at an $i^{th}$ sample in the time interval T. Relative channel occupancy, $C_{occupancy}$ can be determined by $C_{occupancy}=TC/T \times 100$, i.e., a percentage of time the channel was occupied during the time interval.

Alternatively, the measure can be based on the relative amount of time the network allocation vector (NAV) is non-zero, because under 802.11e and EDCA with CSMA/CA, each node has to sense the channel and set the NAV appropriately. The commonly used beacon interval of 802.11d wireless networks can be used as the time interval T.

In a network with access categories as defined above, the admission control can use low and high occupancy thresholds $T_{lo}$ and $T_{hi}$. If $C_{occupancy}>T_{hi}$ the channel is considered overloaded, and the node remains idle. If $C_{occupancy}<T_{lo}$, then the channel is considered under loaded, and more traffic can be admitted in the channel without a degradation of QoS. If $T_{lo}<C_{occupancy}<T_{hi}$, then the channel is an optimal state.

Criteria for activating access categories based on these two thresholds are as follows. If $C_{occupancy}>T_{hi}$, then deactivate a lowest priority active AC. If $T_{lo}<C_{occupancy}<T_{hi}$, then take no action. If $C_{occupancy}<T_{lo}$, then activate an inactive AC with a highest priority action.

Measuring Channel Traffic Condition While Nodes are Busy

In addition, each node measures the channel traffic condition while it is busy and transmitting packets. In this case, the traffic condition is a collision ratio during each time interval. A collision is presumed every time the node has to retransmit a packet. It is presumed that the packet was lost because of a collision. Thus, an average collision ratio is defined as a number of collisions divided by the total number of packet transmissions on the channel during the time interval.

The average collision ratio $R_c$ can be determined by, $$R_c = \frac{N_c}{N_t},$$

where $N_c$ is the number of collisions, and $N_t$ is the total number of packets transmitted. As above, two thresholds $R_{lo}$ and $R_{hi}$ can be used. If $R_c > R_{hi}$, then the channel is overloaded. If $R_c < R_{lo}$, then the channel is under loaded. If $R_{lo} < R_c < R_{hi}$, then the channel is in an optimal traffic condition. The criteria to activate access categories are: If $R_c > R_{hi}$ then deactivate a lowest active AC. If $R_{lo} < R_c < R_{hi}$, then taken no action. If $R_c < R_{lo}$, then activate an inactive AC with a highest priority.

FIG. 3, shows the overall structure of the admission control according to the invention. While each node is in an idle state 301, the measured 301 traffic condition is a relative amount of time the channel is occupied, if the node is in a busy state 302, then the measured 302 traffic condition is a collision ratiorat. Passing the threshold test in the idle state allows the node to enter the busy state, and failing the threshold test in the busy state sends the node back to the idle state.

In either case, the measuring is passive, i.e., does not increase the amount of network traffic, and the measuring is distributed, i.e., each node in the network does the measuring, depending on the state of the node.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for distributed admission control in communication channels of a network including a plurality of nodes, comprising:

measuring passively, at each node, a traffic condition of a communication channel during successive time intervals having a predetermined length, in which the traffic condition is channel occupancy, and in which each node in the network includes a plurality of access categories which can be active or inactive, each access category being associated with a priority level for packets;

comparing, at a particular node, the measured traffic condition for a last time interval to a threshold, in which the threshold includes a high threshold; and changing the state of the node depending on the comparison, in which the changing further comprises:

changing the state of the particular node from idle to busy if the channel occupancy is less than the threshold, and deactivating an active access category having a lowest priority level if the channel occupancy is greater than the high threshold.

2. The method of claim 1, further comprising:

detecting a carrier signal in the channel to measure the channel occupancy.

3. The method of claim 1, further comprising:

detecting a zero allocation vector in the particular node to measure the channel occupancy.

4. The method of claim 1, in which the threshold includes a low threshold, and further comprising:

activating an inactive access category having a highest associated priority level if the channel occupancy is less than the low threshold.

5. The method of claim 1, in which the traffic condition is a collision ratio, and further comprising:

changing the state of the particular node from busy to idle if the collision ratio is greater than the threshold.

6. The method of claim 5, further comprising:

deactivating an active access category having a lowest priority level if the collision ratio is greater than the high threshold.

7. The method of claim 6, in which the threshold includes a low threshold, and further comprising:

activating an inactive access category having a highest associated priority level if the collision ratio is less than the low threshold.

8. A method for distributed admission control in communication channels of a network including a plurality of nodes, each node being either in an idle or busy state, each node in the network including a plurality of access categories which can be active or inactive, each access category being associated with a priority level for packets, comprising:

measuring passively, at each idle node, a channel occupancy of a communication channel during successive time intervals having a predetermined length;

comparing the channel occupancy for a last time interval to first threshold, in which the first threshold includes a high threshold; and changing the state of the node from idle to busy depending on the comparing, in which the changing further comprises:

changing the state of the particular node from idle to busy if the channel occupancy is less than the threshold; and deactivating an active access category having a lowest priority level if the channel occupancy is greater than the high threshold; and measuring, at each busy node, a collision ratio of the communication channel during successive time intervals having the predetermined length;

comparing the collision ratio for a last time interval to a second threshold; and changing the state of the node from busy to idle depending on the comparing.

* * * * *